United States Patent Office 3,310,554
Patented Mar. 21, 1967

3,310,554
2H-1,3,5-OXADIAZINES
Robert A. Braun, Newark, Del., assignor to E. I. du Pont de Nemours and Company, Wilmington, Del., a corporation of Delaware
No Drawing. Filed Mar. 31, 1965, Ser. No. 444,438
5 Claims. (Cl. 260—244)

This application is a continuation-in-part of application Ser. No. 289,416, filed June 20, 1963, now abandoned.

This invention relates to substituted oxadiazines and is more particularly directed to oxadiazines of the formula (1) 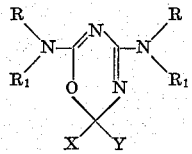

where

R and $R_1$ can be hydrogen; alkyl of 1 through 5 carbon atoms; alkyl of 1 through 5 carbon atoms substituted with such radicals as cyano, nitro, alkoxy of 1 through 5 carbon atoms, chlorine or fluorine; alkenyl of 2 through 5 carbon atoms; cycloalkyl of 4 through 7 carbon atoms; and phenyl; with the proviso that R and $R_1$ can be joined together by an alkylene bridge of 2 through 7 carbon atoms; and X and Y can be perchloroalkyl, perfluoroalkyl or mixed perchloro-perfluoroalkyl, all of 1 through 5 carbon atoms.

By perchloroalkyl, perfluoroalkyl and perchlorofluoroalkyl is meant such radicals as —$CF_3$, —$CF_2Cl$, —$C_3F_7$, —$C_5F_{11}$, —$CCl_3$, —$C_2F_5$, —$C_4F_9$, —$CF_2$—$CF_2Cl$ and —$CFCl_2$.

Preparation of the compounds

These oxadiazines can be prepared by the reaction of a cyanamide with a perhaloketone according to the following general equation:

(2) 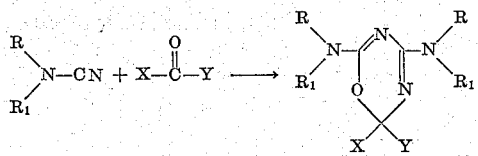

where R, $R_1$, X and Y are defined as in Formula 1.

The simple aliphatic cyanamides used in this reaction are available commercially. The more complicated substituted cyanamides can be made by the reaction of primary or secondary amines with cyanogen halides. Such a reaction is described in more detail in U.S. Patents 2,985,683, 2,658,915, 2,443,504, and British Patent 549,368. Those cyanamide reactants whose R groups are bridged can be prepared according to procedures disclosed in JACS, 72, 2280 (1949).

The lower perhaloketone reactants are also available commercially. The higher ketones can be made by methods described in detail in R. N. Hazeldine, J. Chem. Soc., 1748 (1948) and M. Hauptschein and R. A. Braun, JACS, 77, 4930 (1955).

The compounds of the invention are prepared according to Equation 2 by mixing suitable reactants, in stoichiometric proportions or with a slight excess of the cyanamide, and then either heating them in a bomb or refluxing them, the method depending on the boiling point of the ketone. The reaction can also be carried out in an inert solvent such as an aromatic or aliphatic hydrocarbon.

When conducted in a bomb, the reaction is preferably run at a temperature of 25 to 175° C. In this temperature range, the reaction will take from 1 to 24 hours to complete, the actual time naturally depending on the temperature.

The product separates out as a solid, which can be removed from the reaction mass by such customary chemical procedures as filtration or centrifugation. This product can be either recrystallized from hydrocarbons, esters or ketones, or it can be purified by sublimation.

Utility

Because of the presence of amino groups in their structure, these oxadiazines can be used, in the usual concentrations, as catalysts for the polymerization of urethane polymers and epoxy resins.

Those compounds having ethylenically unsaturated substituents can be homopolymerized or can be used as cross-linking agents in other vinyl copolymers, using customary vinyl polymerization techniques. Such polymers, in turn, are useful in preparing coating compositions and textile finishes.

The compounds which contain free $NH_2$ groups can be used as intermediates in the preparation of novel diisocyanates. Preparation of these diisocyanates can proceed according to the following equation:

(3) 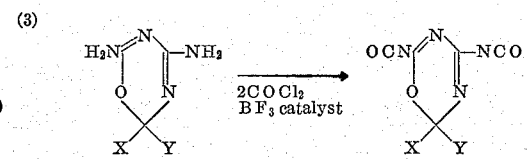

These diisocyanates can in turn be used to insert fluorine atoms into polyureas and polyurethanes to enhance their water repellency and antisoiling properties.

Those compounds of the invention which are normally liquid at room temperature and higher can also be used as heat transfer agents in hydraulic systems.

This invention will be better understood by referring to the following illustrative examples. In these examples, all parts are by weight.

EXAMPLE 1

A mixture of 34 parts of dimethyl cyanamide and 35 parts of hexafluoroacetone was heated at 175° C. for three hours in a stainless steel bomb at autogenous pressure.

The crystalline product, 2,4-bis(dimethylamino)-6,6-bis(trifluoromethyl)-2H-1,3,5-oxadiazine, was filtered off, dried and recrystallized twice from ethyl acetate to give a white solid having a melting point of 136° C.

Dimethyl cyanamide can be replaced with the listed amounts of any of the following substituted cyanamides and reacted with hexafluoroacetone in a similar fashion to give the corresponding listed oxadiazines of the invention:

| Reactant | Amount | Product |
|---|---|---|
| $C_6H_5N(C_2H_5)-CN$ | 73.0 | 2,4-bis($C_6H_5$, $CH_3$ amino)-6,6-bis($CF_3$)-2H-1,3,5-oxadiazine |
| $CH_2=CH-N(CH_3)-CN$ | 41.0 | 2,4-bis($CH_2=CH$, $CH_3$ amino)-6,6-bis($CF_3$)-2H-1,3,5-oxadiazine |
| $(O_2N-CH_2-CH_2-)_2NCN$ | 94.5 | 2,4-bis($(O_2NCH_2CH_2)_2N$)-6,6-bis($CF_3$)-2H-1,3,5-oxadiazine |
| $(CH_3O-CH_2-CH_2-)_2N-CN$ | 79.0 | 2,4-bis($(CH_3OCH_2CH_2)_2N$)-6,6-bis($CF_3$)-2H-1,3,5-oxadiazine |

In a similar fashion, the following heterocyclic cyanamides can be reacted with hexafluoroacetone, in the listed proportions to give the corresponding listed products:

| Reactant | Amount | Product |
|---|---|---|
| pyrrolidine-N-CN | 48.0 | 2,4-bis(pyrrolidino)-6,6-bis($CF_3$)-oxadiazine |
| piperidine-N-CN | 55.0 | 2,4-bis(piperidino)-6,6-bis($CF_3$)-oxadiazine |
| hexamethyleneimine-N-CN | 62.0 | 2,4-bis(hexamethyleneimino)-6,6-bis($CF_3$)-oxadiazine |

EXAMPLE 2

Seventy parts of dimethyl cyanamide were added to 199 parts of dichlorotetrafluoroacetone. The mixture was then heated at 45° C. for four hours under nitrogen and cooled.

A white crystalline solid, 2,4-bis(dimethylamino)-6,6-bis(chlorodifluoromethyl)-2H-1,3,5-oxadiazine, having a melting point of 160° C. was collected by filtration.

The listed quantities of any of the following substituted cyanamides can be used in place of dimethyl cyanamide and reacted with dichlorotetrafluoroacetone to give the corresponding listed oxadiazines of the invention:

| Reactant | Amount | Product |
|---|---|---|
| phenylthio-N(CH=CH_2)-CN | 150.0 | 2,4-bis(phenylthio, $CH_2=CH$ amino)-6,6-bis($CF_3$)-oxadiazine |
| $(ClCH_2-CH_2)_2NCN$ | 167.0 | 2,4-bis($(ClCH_2CH_2)_2N$)-6,6-bis($CF_3$)-oxadiazine |
| $NC-CH_2-CH_2-N(C_6H_5)-CN$ | 171.0 | 2,4-bis($NCCH_2CH_2$, $C_6H_5$ amino)-6,6-bis($CF_3$)-oxadiazine |

EXAMPLE 3

A mixture of 41 parts of diallyl cyanamide and 28.2 parts of hexafluoroacetone was heated at 150° C. for four hours in a stainless steel bomb.

The resulting 2,4-bis(diallylamino)-6,6-bis(trifluoromethyl)-2H-1,3,5-oxidiazine was stripped at 0.1 millimeter of pressure to give a clear viscous liquid product.

EXAMPLE 4

To a solution of 4.2 parts of cyanamide in about 17 ml. of ethyl ether were added dropwise, with stirring, over one-half hour, 19.9 parts of dichlorotetrafluoroacetone.

The solution was allowed to cool to room temperature, and the crystalline solid which precipitated was removed by filtration and recrystallized from acetone to give 4,6-diamino - 2,2 - bis(dichlorofluoromethyl) - 2H - 1,3,5-oxadiazine solvated with one-half mole of acetone, M.P. 191 to 191.4° C.

The filtrate was evaporated at room temperature and reduced pressure, and the residual oil was heated to about 100° C. for a few minutes. During this time, dichlorotetrafluoroacetone distilled off leaving behind crystalline 2,4 - bis - diamino - 6,6 - bis(dichlorofluoromethyl) - 2H-1,3,5-oxadiazine.

The oxadiazine was combined with the solvated oxadiazine and the mixture was recrystallized from acetone. The acetone of solvation was removed from the product by heating at 70° C. and 1 mm. of pressure for about 18 hours, to give unsolvated 2,4-bis-diamino-6,6-bis(dichlorofluoromethyl)-2H-1,3,5-oxadiazine.

What is claimed is:

1. A compound of the formula

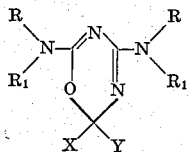

where

R and R$_1$ are selected from the group consisting of hydrogen; alkyl of 1 through 5 carbon atoms; alkyl of 1 through 5 carbon atoms substituted with a radical selected from the group consisting of cyano, nitro, alkoxy of 1 through 5 carbon atoms, chlorine and fluorine; alkenyl of 2 through 5 carbon atoms; cycloalkyl of 4 through 7 carbon atoms; and phenyl; with the proviso that R and R$_1$ can be joined together by an alkylene bridge of 2 through 7 carbon atoms; and X and Y are selected from the group consisting of perchloroalkyl radicals, perfluoroalkyl radicals, and mixed perchloro-perfluoroalkyl radicals, all of 1 through 5 carbon atoms.

2. 2,4 - bis(dimethylamino) - 6,6-bis(trifluoromethyl)-2H-1,3,5-oxadiazine.

3. 2,4 - bis(dimethylamino) - 6,6 - bis(chlorodifluoromethyl)-2H-1,3,5-oxadiazine.

4. 2,4 - bis(diallylamino) - 6,6 - bis(trifluoromethyl)-2H-1,3,5-oxadiazine.

5. 2,4 - bis - diamino - 6,6 - bis(dichlorofluoromethyl)-2H-1,3,5-oxadiazine.

No references cited.

WALTER A. MODANCE, *Primary Examiner.*
R. BOND, *Assistant Examiner.*